Aug. 3, 1954     D. COLLINS     2,685,651
STARTING SYSTEM
Filed May 24, 1952     6 Sheets-Sheet 1

INVENTOR.
DOUGLAS COLLINS
BY
Laurence M. Goodridge
ATTORNEY

INVENTOR.
DOUGLAS COLLINS

INVENTOR.
DOUGLAS COLLINS
BY
Laurence M. Goodridge
ATTORNEY

Aug. 3, 1954

D. COLLINS 2,685,651

STARTING SYSTEM

Filed May 24, 1952

INVENTOR.
DOUGLAS COLLINS
BY
Laurence M. Goodridge
ATTORNEY

Aug. 3, 1954

D. COLLINS 2,685,651

STARTING SYSTEM

Filed May 24, 1952

INVENTOR.
DOUGLAS COLLINS
BY
*Laurence M. Goodridge*
ATTORNEY

Aug. 3, 1954

D. COLLINS 2,685,651

STARTING SYSTEM

Filed May 24, 1952

INVENTOR.
DOUGLAS COLLINS
BY
Lawrence M. Goodridge
ATTORNEY

Patented Aug. 3, 1954

2,685,651

UNITED STATES PATENT OFFICE 2,685,651

STARTING SYSTEM

Douglas Collins, Salisbury, N. C.

Application May 24, 1952, Serial No. 289,865

22 Claims. (Cl. 290—28)

This invention relates to control systems of the automatic and semi-automatic type for the electric starter motors of internal combustion engines in motor vehicles, or the like. More specifically, it relates to that part of the control system of this type which actuates relays or directly controls the electric power supply to the starter motor for the engine.

By way of explanation, it appears desirable to outline briefly the background for the present invention by describing generally the starter motor systems employed in present models of motor cars, especially those equipped with automatic transmissions. In order to restart the engine when it stalls, it is necessary to move the transmission control selector lever from a selected driving position to a neutral or park position. This obvious safety feature is necessary to prevent injury to the vehicle, its occupants, or adjacent persons or property in case the engine should be started with the control selector lever in a selected driving position. This safety feature is generally performed by a safety switch in the starter motor control circuit operated to be effective in the drive positions to disable the starter motor control circuit. The function of this switch is desirable and necessary because, as will be later explained, with the present types of automatic transmissions, it is not immediately apparent to an operator from vehicle response alone that the transmission is engaged or in gear, as it is with conventional gear transmissions.

In motor vehicles equipped with gear selecting transmissions generally heretofore used in motor vehicles, it was rather common practice to leave the transmission control selector lever in a drive position when the engine was inoperative. When such a practice is followed, however, if the operator forgets to release the clutch or shift to neutral before operating the starter switch, the sudden movement of the car usually is sufficient warning to the operator for him to release the clutch or the starter switch in time before the engine can start, and no serious damage is done. This is because the starter is driving the car forward or backward, as the case may be, and battery power is insufficient to drive the engine and vehicle fast enough to effectively crank and start the engine. Nevertheless, the danger to property and persons adjacent the vehicle is still present, which danger makes the above described safety feature desirable.

With the automatic transmissions, the resulting dangers are multiplied. Practically all types now in use incorporate a fluid coupling or torque converter in the primary drive between the engine and the wheels. In the absence of a safety feature such as that performed by the above described safety switch, if the starter were operated with the control lever in a driving position, there obviously would not be the immediate warning movement such as experienced in the direct gear types of transmission; nor would a heavy load be imposed on the battery because of the amount of slip inherent in fluid drives at low speed. For this reason, the engine would start and the car surge forward or backward, depending on the position of the transmission control selector lever.

Because these dangers were obvious to most motor car manufacturers, the control circuit for the starter was provided with an additional switch operated by position of the transmission control selector lever and connected in series with the ignition switch or manually operated starter switch, or both, which additional switch is closed only in an indicated neutral or park position of the transmission control selector lever.

Although this provides a desirable safety feature, it also has many disadvantages, some of which have been set forth in my co-pending application with George R. Ericson, Serial No. 223,778, filed April 30, 1951, for automatic starting system. For this reason, it is not deemed necessary to repeat the same matter in this application. It seems only necessary to point out here that the disadvantages mentioned therein apply to all types of transmissions, whether of the standard gear or automatic type, which are provided with a safety switch controlling the starter circuit operated by the position of the transmission control selector lever.

An object of the invention is to provide in a motor vehicle a power responsive means to momentarily shunt a portion of a control system for an interval determined by a thermal responsive element.

A further object of the invention is to provide an additional circuit in shunt relation to a starter control means operated in response to engine failure for an interval determined by the action of a thermal responsive element.

A further object of this invention is to provide a power responsive control means for an additional circuit arranged to shunt or by-pass the safety switch in a starter circuit, which circuit contains a switch having two cycles of operation operated at predetermined intervals in response to the action of the thermal responsive element.

A further object of the invention is to provide a better responsive control means for an additional circuit in shunt relation with a starter circuit control switch which has inherently three cycles of operation each time the engine is stalled.

It is a further object of the invention to provide in a motor vehicle an automatic restarting system or semi-automatic restarting system operative in case the engine stalls, and automatically disabled after a fixed period determined by a magnetic thermal responsive element.

A further object of the invention is to provide a plurality of additional circuits in shunt relation to the control switches in a starter motor control system operated in response to engine failure with the transmission control selector lever in an indicated driving position, which additional circuits provide emergency restarting of the engine for a fixed time determined by a thermal responsive element.

A further object of the invention is to provide an additional circuit in shunt relation with respect to the manual starter motor switch provided with a means operated in response to engine failure when the control selector lever is in an indicated driving position, which will provide a means active after engine failure for a period of time determined by a thermal responsive element providing for starter operation by movement of the control selector lever toward a neutral or park position.

It is the object of this invention to provide a power responsive control means and an additional circuit controlled by said means to temporarily by-pass or shunt that portion of the starter circuit controlled by a switch operated by the transmission control selector lever and to operate for a fixed period, determined by a thermal responsive means.

A further object of the invention is to provide an additional circuit in shunt relation with the control switches of a starter circuit, said circuit having a means operated in response to engine failure (when the control selector lever is in an indicated driving position) which will provide a time delay by action of a thermal responsive element effective after engine failure to allow the engine to come to a full stop, thereby automatically preventing starter operation, and which will subsequently become effective to automatically restart the engine.

A further object of the invention is to provide an additional circuit in shunt relation with a control means in the starter motor circuit operated in response to engine failure when the control selector lever is in an indicated driving position, which will provide a time delay determined by a thermal responsive element after engine failure to allow the engine to come to a full stop, thereby automatically preventing starter operation by the operator of the vehicle by inadvertent or unintentional premature operation of the manual starter switch.

Other objects of the invention will become apparent as the description proceeds.

*Brief description*

According to the invention, these objects are attained by providing the usual electric starter control system of the type wherein the control system includes a manually operated control means in the system and a control means in the system operated by movement of the control selector lever for the transmission, with an additional control means to shunt or by-pass either one or both of the above described control means. The additional shunt means in this case is an electric circuit (since only an electric system has been shown), which circuit is controlled by a switch responsive to power generated by either the operation of the engine or the transmission. The additional circuit-controlling switch may be of a two-cycle or three-cycle type. In the case of a two-cycle type, the control for the switch is responsive to operation of the engine, or responsive to a condition indicative of operation of the engine to close the switch in its first cycle, and thereby condition the additional circuit for operation and, responsive to engine failure, to hold it closed for a cycle of operation during a predetermined period after the engine is stalled, determined by the resistance heating by an electric current of a thermal responsive element. At the end of this period the switch is operated to open the circuit in the second cycle, thereby restoring the control to the manually operated starter control means. The shunt control mentioned, and the switches, may be combined, as later pointed out, or they may be separate, but connected, devices.

A second form of switch is provided of the three-cycle type controlled by means responsive to a condition indicative of operation of the engine to condition the switch for operation and, in its first cycle after the engine stalls, to maintain the switch open for a predetermined interval and then operate a means to close the switch for its second cycle and maintain it closed for a predetermined time determined by a thermal responsive element, and then, by operation of the thermal element, to open the switch, thereby restoring the control during the third switch cycle to the starter control means previously mentioned.

The invention is primarily intended as equipment for motor vehicles with automatic transmissions of any type, but, as will be pointed out, for different types one form thereof may be considered more desirable than another.

In case the motor vehicle is equipped with an automatic transmission of the type which includes a direct drive through a fluid coupling or torque converter, a planetary gearing operated by brakes or clutches, or both, either automatically or manually, the transmission selector control lever usually is connected to operate a switch in the starter system control circuit such as herein described. In such cases it is usual to provide such a switch, termed here a "safety switch," which is closed only in the neutral and park positions of the selector control lever for the transmission.

According to the invention, the objects are attained with the above type of transmission by providing the usual electric starter control system wherein the circuit includes an ignition switch, a safety switch, and a manually operated starter switch in series relation, with an additional circuit to shunt the two last mentioned switches. (The inclusion in this circuit of the ignition switch is usual, but wholly optional.) The additional circuit, in turn, is controlled by a switch responsive to power generated by either the operation of the engine or transmission, which is a condition indicative of engine operation. As above explained, the additional circuit switches may be of the two- or three-cycle type, with the inherent advantages of either.

The additional circuit as above described may be connected to by-pass or shunt both the safety switch and the manual control starter switch, whether the latter be combined with the ignition switch or separate therefrom, in which case an automatic restarting system is obtained.

On the other hand, the additional circuit may be arranged to by-pass only the safety switch. This system has inherent advantages useful in combination with the transmission of the above type to provide semi-automatic restarting by operation of the manual starter switch only.

While it is contemplated that the inter-connection of the additional circuits above described are generally useful with all automatic transmissions, one may be more suitable with a particular transmission than another. In a motor vehicle equipped with an automatic transmission of the type which includes a fluid coupling and a system of gearing usually automatically operated to transmit the drive from the engine to the vehicle wheels, wherein only a portion of the total driving torque is transmitted through the fluid of the coupling, it is usual to provide the same type of safety switch in the starter control system as that before mentioned. Due to the characteristics of this transmission type, however, probably less than half of the driving torque is transmitted through a fluid coupling, and the amount of slip is therefore materially less. Consequently, it might be undesirable to provide a fully automatic restarting system or activate the starter circuit by the manual starter switch alone when the transmission selector lever is in any one driving position. For this type of transmission, therefore, it would probably be more suitable to apply the present invention by connecting the additional circuit to shunt or by-pass the manually operated starter switch rather than the safety switch. Since the aforesaid additional circuit is controlled by a switch responsive to a condition indicative of operation of the engine or transmission, the additional circuit would be effective on engine failure to energize the starter circuit on movement of the control selector lever to a neutral or park position. As above explained, the switch in the additional circuit may be of the two- or three-cycle type with the inherent advantages of either.

From the above brief description, the objects of the invention, including semi-automatic and complete automatic restarting of the engine after it stalls, are attained by merely using either one of the shunt circuits or by combining two of the shunt circuits with the conventional electric starter motor circuit and with the shunt circuits arranged to by-pass either the safety switch or the manual starter switch, or both, as the case may be. Obviously, where both circuits are used, the same objects would be attained by one circuit which was connected to shunt or by-pass both the safety switch and the manual starter switch, but, for purposes of illustration, it appears that the present disclosure of two is preferable.

From the above brief description, the objects of the invention to provide semi-automatic restarting of a stalled engine are obtained by merely combining one of the additional shunt circuits with either the manual starter swtich or the safety switch. The choice depends upon which is deemed more suitable for the particular transmission characteristics. Likewise, the choice of the type of switches, either two- or three-cycle, depends upon the particular motor vehicle. It is emphasized that the additional circuits, their control switches, and operations, are more or less interchangeable, depending upon the results desired. Likewise, the application of the additional circuit to shunt one or more of the several switches of the starter control system is optional, for the reasons above set forth.

In the drawings, Fig. 1 is a diagrammatic illustration of the parts of an electrical starter motor system such as in general use and regarded as exemplary, showing the application of the present invention for full automatic restarting.

Figure 1:
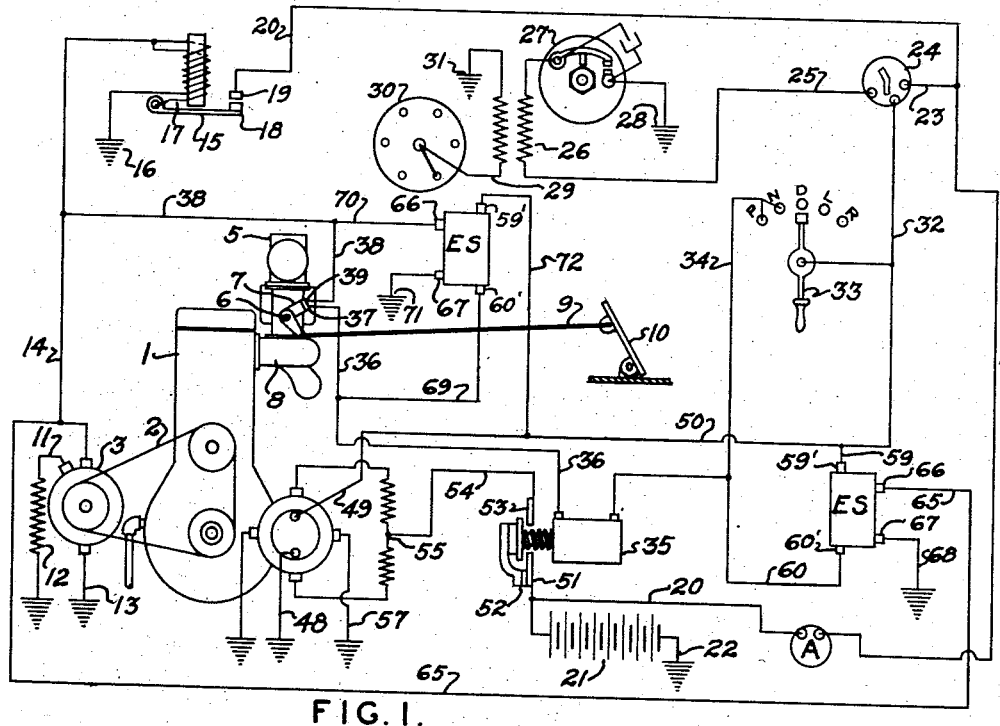

The showing in Fig. 1 is regarded as a diagrammatic illustration of the application of additional shunt control circuits as applied to an electrical starter control system deemed illustrative of conventional practice as applied to control the starter motor for an internal combustion engine. The resulting circuit is adapted for vehicle engine starter control regardless of the type of transmission used, since it will operate satisfactorily with either direct gear or automatic types. It seems, however, to be particularly well adapted to a type of transmission which incorporates a fluid coupling or torque converter, or the like, in the direct drive from the engine to the driving gear.

In the drawings, 1 indicates an engine which drives a generator 3 through a belt connection 2. The engine is provided with the usual carburetor 5 and manifold 6, and incorporates a throttle valve shaft 6 connected to operate a pressure responsive switch generally indicated as 7, similar to that of the Coffey Reissue Patent No. 22,385. A connection 9 is provided between the throttle valve shaft 6 and an accelerator pedal 10. Generator 3 is provided with a field connection 11 through a resistance 12 to ground. The armature is provided with two brushes, one of which is grounded at 13, and the other of which is connected by a lead 14 to the electromagnet of a generator cut-out 15, and then to ground 16. A second circuit 17 connects lead 14 to one terminal of cut-out 15. The other terminal 18 connects with a contact 19 to close the circuit through lead 20 to a battery 21, from which the circuit extends to a ground 22. When the generator is driven, cut-out 15 is closed, and current flows through leads 14, cut-out 15, and lead 20 to the battery.

An engine ignition circuit is shown connected to the battery by a lead 23, which extends from the battery to the primary of a twist switch 24, which is the type actuated by a key completing the circuit through the lead 25 to the primary of a coil 26 of the engine operated breaker points generally indicated as 27, and thence to ground 28. The secondary of coil 26 is connected by a lead 29 to a distributor generally indicated as 30, and thence to ground 31. These connections are intended to illustrate generally the elements of a conventional ignition system for the spark plugs, and, since this part of the disclosure is immaterial to the present invention, a further explanation does not appear necessasry.

The starter system control circuit will now be described in detail. Starting first at twist switch 24, it is generally a feature with constructions now prevalent in the art that the operation of the twist or ignition switch energizes a part of the starter circuit through a lead 32, which is connected to one terminal of a switch (not shown) mechanically operated by a transmission control selector lever 33. This lever has several possible positions indicated as P N D L R, each of which corresponds to driving and neutral positions of the transmission which may be selected at will by the operator by movement of the lever 33 into registry to condition the transmission for operation. The mechanically operated switch on the lever 33 connects lead 32 to a lead 34 only when the lever 33 is positioned in the P and N positions. Lead 34, in turn, is connected to a starter solenoid switch 35. The other terminal of solenoid 35 is connected by a lead 36 to one terminal 37 of pressure responsive starter switch 7, which has a lead 38 connected to its opposite terminal 39, extending to lead 14, and thence to ground 13, when cut-out 15 has opened and the generator or engine has ceased to operate.

Switch 7 is of the type shown in the Coffey reissue patent above referred to and, since it forms no part of the present invention, it is not described or illustrated in detail. Its general function is well known in the art, and operates to mechanically connect the throttle shaft and the switch for operation of the latter when the engine is stopped and has come to rest. On the other hand, when the engine is in operation, the clutch between the throttle shaft and the switch is disengaged, and the switch 7 is accordingly inoperative on movement of the throttle shaft.

The starter motor circuit is of the type which has one brush grounded by a lead 48, and the other connected to the battery by leads 49, 50, 32, through twist switch 24 to leads 23 and 20, which is, in turn, connected to the battery terminal. The field circuit for the starter motor includes a lead 51 connected to lead 20 and to terminal 52 of the starter solenoid operated switch 35. The opposite terminal 53 thereof connects by way of lead 54 at 55 to a split field circuit of the starter motor. Each field is connected to ground through a common lead 57. So far, the starter circuit described is similar to that shown in the Coffey Reissue Patent No. 22,385.

To the basic system so far described, two added circuits are applied in order to make the starter control system completely automatic to restart the engine when it stalls. It should be understood, however, that two circuits are illustrated to facilitate understanding of the invention as a whole, and that it is contemplated that the two circuits could be combined, using a single switch to serve the same purpose. According to the present invention, a first shunting circuit comprises lead 59 connecting lead 32 by way of terminals 59' and 60' on switch ES with leads 60 and 34, thereby to by-pass or shunt the switch operated by the transmission control selector lever 33. The switch ES is, in turn, provided with a control circuit comprising a lead 65 extending from terminal 66 of the switch to lead 14 from the generator and a terminal 67 connected by way of lead 68 with ground.

According to the invention, a second shunting circuit is provided for the manual starter switch 7 which connects leads 36 and 38 by way of leads 69, terminals 59' and 66 on switch ES, and lead 70. This switch, in turn, is connected to ground by means of lead 71, and with the battery by lead 72 connecting with 50, etc.

The circuits above described, when combined with this basic starter control circuit, provide a system for automatically restarting a stalled engine without any operations necessary on the part of the operator. The switches ES, as will be later described in detail, are provided with a connection to a part of the electric system which is responsive to a condition indicative of engine operation, which, in turn, will initially energize and condition each of the switches ES for operation when the engine is running. After the engine stalls, the switches close to shunt both the safety switch and the manual starter switch for a predetermined time interval, and thereby restart the engine by energizing the starter motor. However, if the engine fails to start after a predetermined period of cranking, the switches ES open due to electric heating of thermal responsive elements therein, and thereby restore control to the safety switch and manually operated starter switch. The switches ES may be identical in construction, or they may differ in their cyclic operation, whichever is deemed desirable. It is sufficient for the purpose now at hand to state that, in the construction now contemplated and later described in detail for switches ES, each is conditioned by an electromagnet with a first winding which is energized after the engine starts and generator 3 builds up substantial voltage, which electromagnetic winding is connected by way of leads 14 and 70 and 14 and 65, respectively, with the generator. Said winding is powerful enough to close a switch blade of bimetallic thermal responsive character, thereby to inter-connect leads 69, 70 and 59, 60, respectively, as the case may be. The magnet is further provided with a holding winding which is energized from the battery by way of lead 59 and connected to ground by way of the generator 3 to hold the switch blade closed after the engine stalls, with ignition switch 24 on, and has come to a complete stop. This switch blade is properly calibrated to open with a snap action in response to the heating effect due to the passage of current therethrough a predetermined time after the engine stops.

Figure 2:
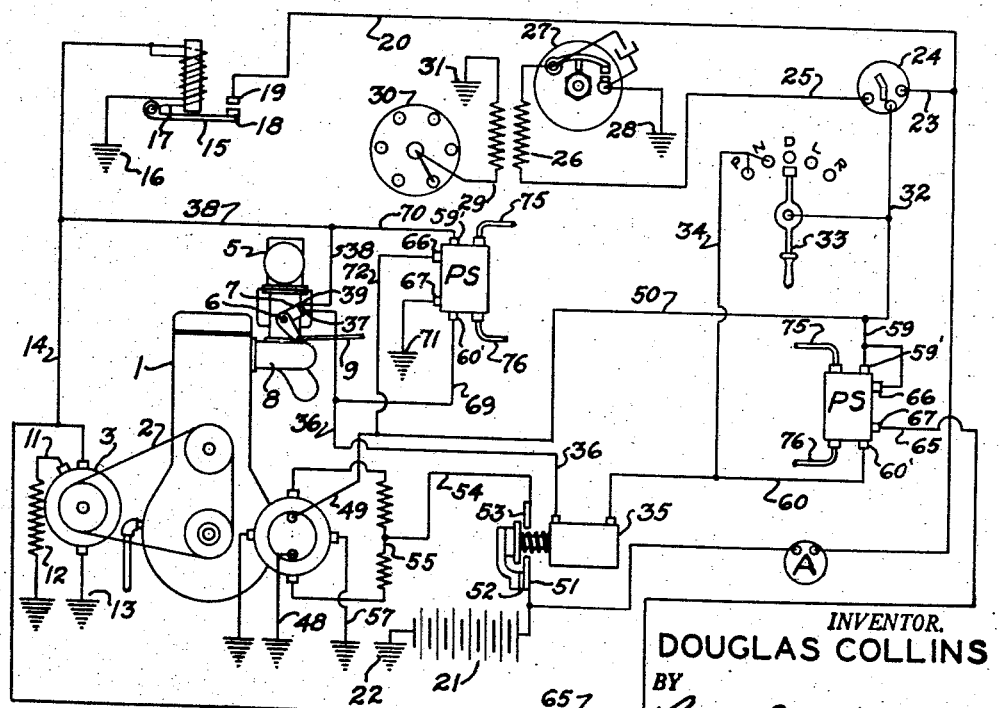
Fig. 2 is a diagrammatic illustration of the same system, including switches of a different type.

Turning now to Fig. 2, a second control circuit, identical with the first, is herein shown, and the same reference characters are applied to designate similar parts. Generally speaking, the only difference between this diagram and the one above explained is in the type of switch used in the shunting or by-passing circuits around the safety switch and around the manually controlled starter switch. In order to distinguish from the switches used in Fig. 1, these switches are indicated by the letters PS. The switches in this diagram are connected to a differential pressure source, which is a means responsive to a condition indicative of engine operation.

In Fig. 2, leads 32 and 34 are connected by a by-pass or shunt circuit around the safety switch operated by the transmission control selector lever 33. This circuit comprises lead 59 from lead 32 connecting through switch PS with lead 60 to lead 34. Terminal 67 of switch PS is connected by way of lead 65 with the ground by way of lead 14 and the generator 3. The switch-conditioning circuit in this modification is by way of terminal 66 to the battery by connection with lead 59. One or two pipes indicated as 75 and 76 are provided on the switch and lead therefrom to a source of differential pressure indicative of engine operation. By way of example, one of the pipes may connect with the intake manifold 8 of the engine 1, and the other be exposed to atmosphere, or, alternatively, one of the pipes 76 may be connected to an oil pressure line of the engine 1 or a pump driven by the engine, such as the fuel pump, and the other 75 be connected with the crankcase of the engine, or its carburetor as will be hereinafter more fully described.

A second shunt circuit is provided in Fig. 2, as in Fig. 1, which circuit comprises a lead 69 to 60′ on a switch PS, and lead 70 inter-connecting switch terminal 59′ with lead 38. A third lead 71 connects terminal 67 on the switch PS to ground, and terminal 66 is connected to the battery by way of lead 72. This switch may be a duplicate of the one just described, and also includes pipes 75 and 76, which may connect with a source of differential pressures indicative of engine operation in a manner such as above described with respect to the first switch.

In operation, the system shown in Fig. 2 is the same as that described for Fig. 1. After the engine has been started in the usual manner by operation of the starter switch and the engine 1 has built up sufficient pressure differential, the switches PS are conditioned to be operated and, upon stalling of the engine and the failure of the pressure differential, which will naturally occur a certain interval after the engine stalls, the switches are actively closed, thereby shunting both the safety switch and the manually operated starter switch. This energizes the starter motor to crank the engine and automatically restart the same without the actuation of any of the controls by the operator. Each switch PS also includes a bimetallic thermal element heated by the passage of current, and properly calibrated to snap open after a predetermined interval, thus de-energizing the starter circuit by opening the shunt circuit and restoring control to the manually operated switches. Both systems in Figs. 1 and 2 are thereby completely automatic, and have the advantage that, no matter what the operator may do, the systems will properly function to restart the engine so long as the ignition switch 24 remains on. In other words, operation of either manual control, which might be inadvertently performed by the operator, would not affect the automatic restarting system.

Figure 3:
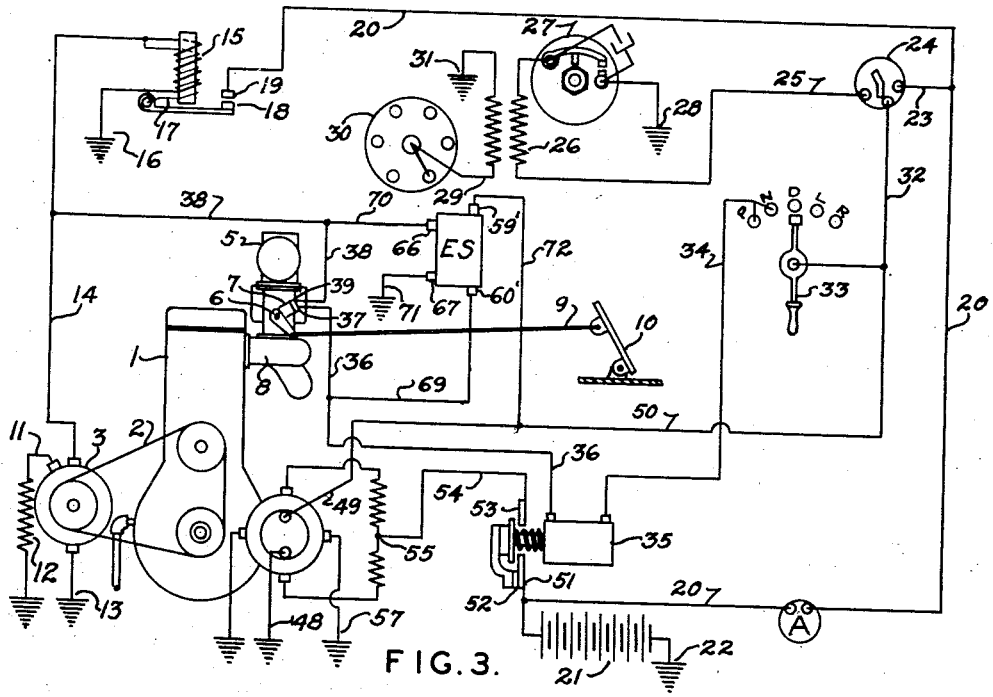
Fig. 3 is a diagrammatic illustration of an electric starter system regarded as conventional, provided with an additional circuit shunting the manually controlled starter switch.
Figure 4:
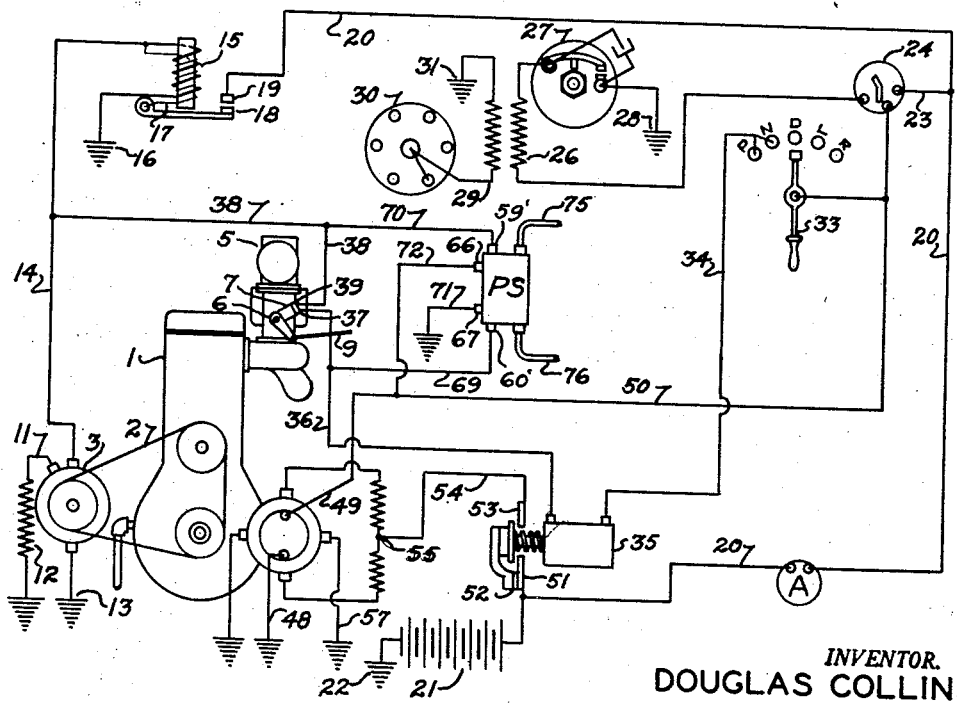
Fig. 4 is the same system illustrating another type of switch.

In Fig. 3, a system has been shown wherein the switch and circuit shunting the safety switch in Figs. 1 and 2 have been omitted, thus resulting in a semi-automatic system for restarting the engine. The parts are the same; consequently, the same reference characters are applicable. The system to be described is, of course, adaptable to any type of engine transmission combination for a motor vehicle, but it is particularly well suited to the type of engine transmission drive wherein only a portion of engine torque passes through the fluid coupling or torque converter, or the like. In such systems it may be preferable to require the operator to move the transmission control on selector lever 33 to a neutral position such as P and N for engaging the starter for restarting a stalled engine. If so, the systems shown in Figs. 3 and 4 are applicable.

In the drawings, 1 indicates the engine which drives a generator 3 through a belt 2. The engine is provided with the usual carburetor 5 on manifold 8, and has a throttle valve shaft 6 connected to operate a pressure responsive switch generally indicated as 7, which may be of the type similar to that of the Coffey Reissue Patent No. 22,385, although it is to be understood that applicant here contemplates the use of his improved system to shunt or by-pass any type of manually operated starter switch. A connection 9 is provided between the throttle valve shaft 6 and accelerator pedal 10 for actuation of the throttle to control the engine when in operation, and for operating the starter switch to perform the initial starting operation. Generator 3 is provided with a field connection 11 through a resistance 12 to ground, and the armature is provided with two brushes, one of which is grounded at 13, and the other of which is connected by a lead 14 to the electromagnet of a generator cut-out 15, and then to ground at 16. A second circuit 17 connects lead 14 to one terminal of cut-out 15. The other terminal 18 connects with a contact 19 to close the circuit through lead 20 to the battery 21 through an ammeter A. The opposite terminal of the battery is grounded at 22. When the generator is driven, a cut-out 15 is closed and current flows through leads 14, cut-out 15, and lead 20, to the battery.

The engine ignition circuit is shown diagrammatically connected to the battery by a lead 23 through twist switch 24, which is of the type actuated by a key completing the circuit through lead 25 through the primary of a coil 26 to the engine operated breaker point generally indicated at 27, and thence to ground at 28. The secondary coil 26 is connected by a lead 29 to a distributor generally indicated at 30 to ground at 31. This diagram is intended to illustrate a conventional ignition system, but, since it forms no part of the present invention, a further detailed explanation does not appear in order.

The starter system control circuit is energized by operation of the twist switch 24 through lead 32 to one terminal of a switch (not shown) mechanically connected for actuation by a transmission control selector lever 33, which has several possible positions indicated as P N D L R. The switch actuated by the lever 33 connects or disconnects lead 32 with lead 34, depending upon the position of lever 33. The other end of lead 34 is connected to a starter solenoid 35. Solenoid 35 is, in turn, connected by lead 36 with one terminal 37 of a pressure responsive manually controlled starter switch 7, which has a lead 38 from the opposite terminal 39 connected to lead 14 and thence to ground 13 when cut-out 15 is open and the generator has ceased to operate.

The switch 7 is of the type shown in the Coffey reissue patent, and forms no part of the particular invention, except in combination with the remaining elements. Detailed explanation does not appear necessary for a complete understanding of the present invention.

The starter motor circuit is of the type which has one brush grounded by a lead 48 and the other connected to the battery by leads 49, 50, and 32 through twist switch 24 and leads 23 and 20. The other circuit for the starter motor field includes a lead 51 connected between lead 20 and terminal 52 of relay 35. The other terminal connects by way of lead 54 to a split field circuit 55 for the starter motor. Each field is connected to ground through a common lead 57. It will be readily apparent that the starter circuits so far described are similar to those of Figs. 1 and 2.

As shown in Fig. 1, a by-pass or shunting circuit is provided around the manually controlled starter switch 7. This circuit includes a lead 69 from lead 36, to switch ES and lead 70 from ES connected to lead 38. The switch is grounded by way of lead 71 and provided with a connection 72 to battery 21. The switch used in this embodiment may be any one of the electric types later to be described, and is connected to a source of electric power which is in this instance responsive to a condition indicative of engine operation, namely, the lead 14 from the generator 3 by way of lead 70. Lead 14 will either be positive or negative, depending upon generator operation, and, since the generator is driven directly by the engine, its polarity will indicate operation of the engine. The switch ES is generally of the type described with respect to Fig. 1, which will be conditioned by generator potential and is provided with a holding circuit by way of a connection to the battery through a thermal element responsive to electric heating. A predetermined time after flow of current begins from the battery to ground through the generator, said element will snap open, and thereby de-energize the shunting circuit.

In operation, after the engine 1 has been started in the usual manner, shunting circuit 69 and 70 through the switch ES is conditioned, and, in case the engine stalls, will close. All that is necessary to restart is to move the selector lever to a neutral position. This will energize the starter circuit through the shunt circuit, and operate the starter to crank the engine. Of course, if the engine should stall with the transmission control selector lever in either the N or P positions, this system will automatically operate the starter to crank the engine.

Turning now to Fig. 4, a second control circuit identical with that of Fig. 3 is herein shown, and similar reference characters are applied to designate the same parts. Generally speaking, the only difference between this electric diagram of the system and the one above explained in Fig. 3 is in the connections to the switch used in the shunting or by-passing circuit around the starter switch 7. In order to distinguish the type of switch used in Fig. 4 from that of Fig. 3, the switch is indicated by the letters PS. This type of switch is adapted to be conditioned for operation by a source of differential pressures rather than through an electric circuit. Switch PS is accordingly provided with two pipes indicated as 75 and 76, which may be connected with a source of differential pressure which provides a means responsive to a condition indicative of engine operation. It is contemplated that the pipes 75 or 76 be connected to a source such as an intake manifold or pump driven by the engine, several examples of which will be described in due course.

In Fig. 4, the leads to and from the manual starter switch 7 indicated as 36 and 38, respectively, are connected by a by-pass or shunt circuit which includes the switch PS and leads 69 and 70 connecting that switch with leads 36 and 38, respectively. The switch PS itself has two terminals 66 and 67 connected, respectively, with the battery through leads 72 and with ground by way of terminal 67 and lead 71.

In operation, the system shown in Fig. 4 is the same as that described above for Fig. 3. After the engine has been started in the usual manner and the engine has built up sufficient pressure differential, the switch PS is conditioned to be operated upon stalling of the engine and, of course, failure of the pressure differential to the switch, which naturally occurs. A certain interval after the engine stalls, the switch is actively closed, thereby shunting the circuit through the manual starter switch. It follows that any movement of the control selector lever from a drive position to a neutral position while the shunt circuit is closed will energize the starter motor to crank the engine. A predetermined period thereafter the switch PS will open, again enabling the circuit through the manual control starter switch 7 to control the starter circuit.

As will be later described in detail, the switch PS includes a bimetallic thermal element heated by the passage of current while the switch is closed. The thermal element is so calibrated as to cause the switch to snap open after a predetermined heating interval, thus de-energizing the starter motor circuit through the shunt circuit and restoring control of the starter motor circuit to the switch 7. Of course, if the engine should stall with the transmission control selector lever in either of the neutral positions, this system, like that in Fig. 3, will automatically operate the starter motor to crank the engine.

Figure 5:
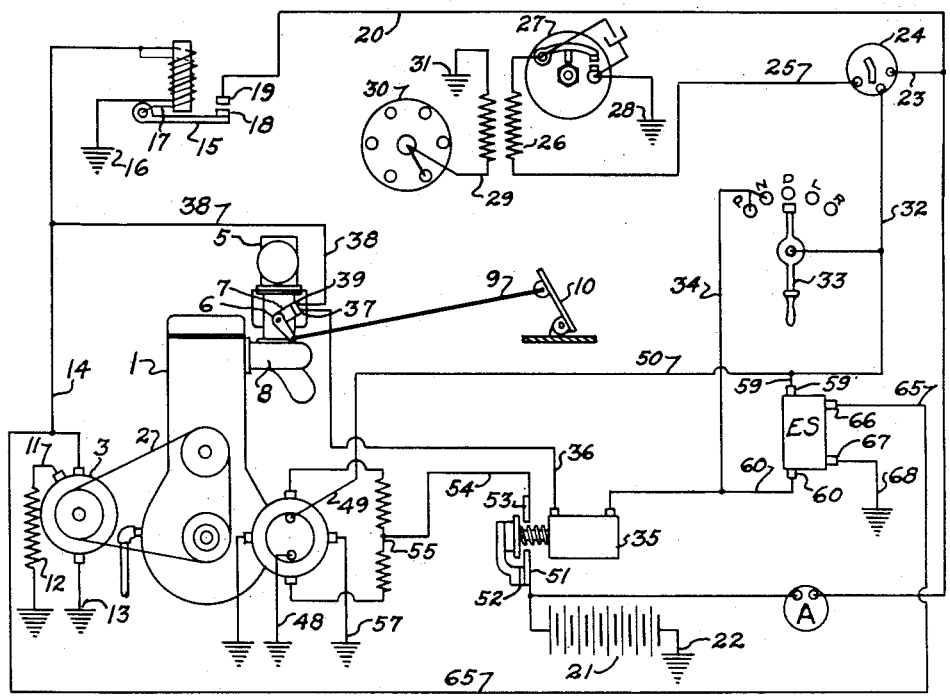
Fig. 5 is a diagrammatic illustration of the part of an electric starter system regarded as exemplary, illustrating the additional circuit connected to shunt or by-pass the safety switch.

Turning now to Fig. 5, a third control circuit is herein shown, and the same reference characters are applied to designate the same parts shown in the previous circuits. Generally speaking, the only difference between this circuit diagram and the ones above explained is that the additional switch is applied to shunting or by-passing the circuit through the safety switch only. Although this involves only the omission of one of the switches shown in Fig. 1, a new result is obtained. The switch designated in this figure as ES is applied to the starter motor control circuit in the identical manner disclosed by Fig. 1, and therefore a detailed explanation of its interconnection in the circuit is not deemed necessary for a complete understanding of the invention.

The basic system generally indicated in Fig. 1 is made semi-automatic in action to restart the engine when it stalls by the elimination of one of the shunt circuits. In this modification, the shunting circuit comprises lead 59 connecting lead 32 by way of switch ES with leads 60 and 34, thereby to by-pass or shunt the safety switch operated by the transmission control selector lever 33. As in Fig. 1, the switch ES is, in turn, provided with a control circuit comprising a lead 65 extending from terminal 66 to the ground by way of lead 14 from the generator, and a lead 68 connecting terminal 67 directly with ground. It is sufficient for an understanding of the circuit to state that the construction now contemplated and later described in detail for the switch ES includes an electromagnet with a first winding which is energized after the engine starts and generator 3 builds up substantial voltage, which winding is connected by way of leads 14, 65 and 68, respectively, with the generator and the ground. This winding is powerful enough to condition a switch blade of a bimetallic thermal responsive character, thereby to inter-connect leads 59 and 60. The electromagnet is further provided with a holding winding which is energized from the battery by way of lead 59 and connected to ground by way of the generator 3, which winding becomes effective when the generator ceases to operate and the engine has come to a complete stop. The switch blade is properly calibrated to open with a snap action in response to the heating effect due to the passage of current through the blade a predetermined time after the engine stops.

In operation, the system shown in Fig. 5 provides a semi-automatic restarting system. When the engine 1 has been started by operation of the usual manual switches, and is operating fast enough to build up a potential in the line 65, switch ES is conditioned for operation. Thereafter, if the engine stalls, switch ES will close inter-connecting leads 59 and 60, thereby shunting or by-passing the safety switch operated by the control selector lever 33. Restarting of the engine involves only the operation of the manual control starter switch in this system; in other words, mere operation of the accelerator pedal 10. This operation will close the starter motor circuit without moving the control selector lever 33 to a neutral position, thus restarting the engine.

Figure 6:
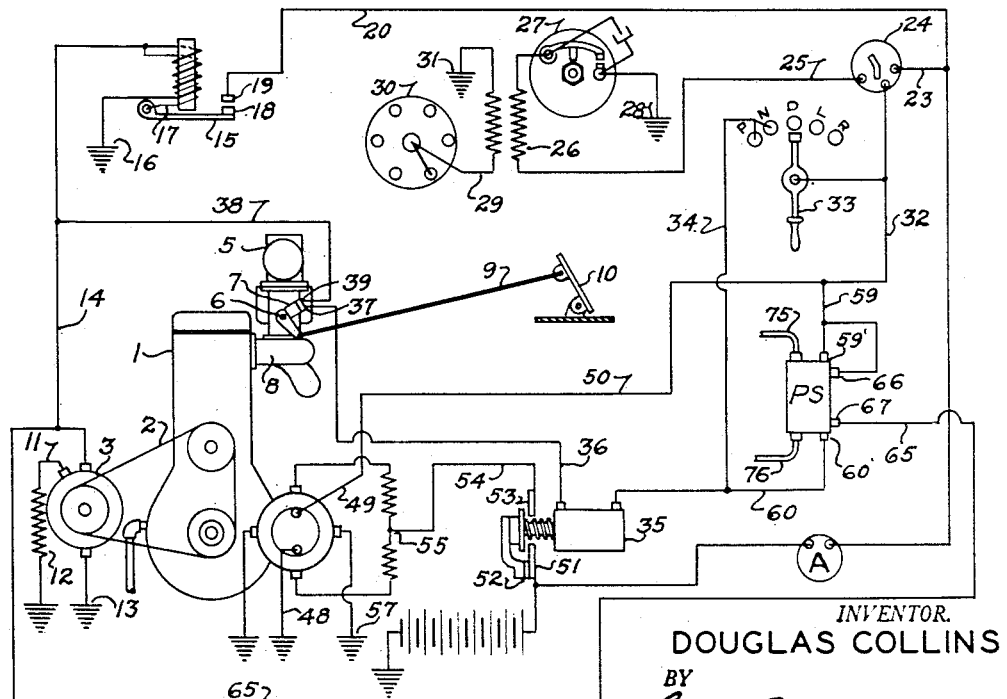
Fig. 6 is a diagrammatic view of the same system as shown in Fig. 5 illustrating a different type of switch.

Turning now to Fig. 6, a second control circuit like that shown in Fig. 5 is herein shown, and similar reference characters are applied to designate similar parts in this system corresponding with those already previously described. Generally speaking, the only difference between this diagrammatic control system and the one above explained is in the type of switch used in the shunting or by-passing circuit around the safety switch. This particular switch is of the type shown in Figs. 2 and 4, and previously explained therein. In order to distinguish this switch from that of Fig. 5, it is indicated by the letters PS and is provided with the usual pipe connections 75 and 76 to a source of differential pressures indicative of engine operation. In Fig. 6, leads 32 and 34 are inter-connected by the shunt circuit around the safety switch operated by the transmission control selector lever 33. This circuit comprises lead 59 from lead 32 connecting through switch PS with lead 60 to lead 34. Due to the fact that battery current is available at all times when the ignition switch is on in the lead 32, the inter-connection of the control circuits to the switch PS differs slightly from those in Fig. 4, wherein the switch PS is connected to shunt the starter switch, but is identical with the connection illustrated in Fig. 2. The electric control connections for switch PS comprise a connection from the terminal 66 to lead 59 and a connection from terminal 67 by way of lead 65 to lead 14 to the ground through the generator.

In operation, the system shown in Fig. 6 is intended to be the same as that described with respect to Fig. 5.

The description so far has been devoted almost exclusively to the improved systems for facilitating restarting an engine. In this description reference has been made to switches ES without any detailed description, for the reason that any switch which will function in the manner above described is suitable for the purpose. However, for purposes of illustration and example, a plurality of switches have been disclosed which appear suitable.

Before beginning a detailed description, it is pointed out by way of explanation that some of the switches have been indicated as ES and some by PS. These reference characters have been used to indicate that the preferred switch in the system is an all electric type ES or a combined differential pressure and electric type PS. As the description proceeds it will become readily apparent that the switches can be so classified, and the structure of each will readily identify the class or type of switch.

Figure 7:
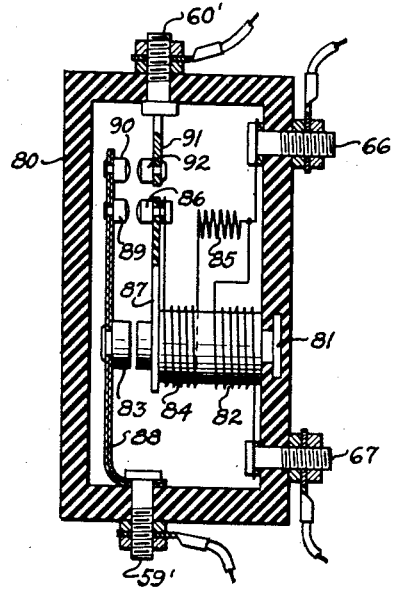
Fig. 7 is a cross-sectional view of a thermal electric switch suitable for use in the above system.

Fig. 7 is exemplary of one type in which a switch casing of insulating material 80 mounts an electromagnetic core 81. The casing is shown in section and may be constructed completely airtight and mounts four electric terminals 60', 66, 67, and 59'. The core is provided with a first winding 82 which conditions the switch for operation. A wire connects from terminal 66 to winding 82 which is, in turn, connected to terminal 67. The core is also provided with a second winding 84, which is a holding winding. Winding 84 is connected by way of resistance 85 with terminal 66 at one end and with switch contact 86 at the other. Contact 86 is supported on a spring arm of insulating material 87 mounted on the magnet core.

Terminal 59' supports a spring switch arm 88 of bimetallic construction provided with an armature 83 adjacent the magnet core, and a pair of electric contacts 89 and 90 adjacent its free end. Contact 89 is adapted to operate with contact 86 of the holding coil 84 while contact 90 cooperates with contact 92 on a metallic spring arm 91 supported on terminal 60'.

Switch arm 88 may have a calibrated electrical resistance producing a heating due to current flow which will produce a force in the switch sufficient to cause it to snap open after a predetermined time interval. Given the desired period of time and the current flow, etc., a precise construction can be attained.

For example, reference is made to The Blue Book of Thermometals and Electrical Contacts, by the H. A. Wilson Company, 105 Chestnut Street, Newark, New Jersey.

On page 6 thereof is the following paragraph:

"For use in circuit interrupting devices, a variety of bimetals is used. In the majority of applications, thermostatic bimetal is required to produce movement and power when subjected to changes in ambient temperature 'alone.' Its electrical resistivity is of secondary importance. However, in many types of circuit breakers, deflection and power are developed through heat generated 'within' the Thermometal, 'due to an electric current passing through it,' the heating being proportional to the square of the current and resistance of the path."

In operation, when connected into the systems described above to shunt the safety switch as in Figs. 1 and 5, terminals 59' and 60' are connected to the shunting circuit and terminals 66 and 67 are connected to the generator and ground, respectively. After the engine 1 starts, current will flow from the generator to ground through winding 82 which has a lower resistance than winding 84 because of resistance 85, and will condition the switch by attracting armature 83 to close the switch arm 88 and contacts 89, 86 and 90, 92.

If the engine stalls with the ignition switch 24 on, then current will flow through terminal 59', contacts 92, 90 and 89, 86, coil 84, resistance 85, to terminal 66, and thus to ground through the generator brushes because, when the generator stops, line 14 will change its polarity. The passage of current in this circuit heats the bimetal switch arm 88 and, after a predetermined interval, the switch snaps open and breaks the circuit from terminal 59' to 60'. During the interval between the time engine 1 stalls and the time switch arm 88 opens contacts 90, 92, the shunting circuit comprising leads 59, switch ES and lead 60, is enabled and the restarting system operative.

In operation, when connected into the systems above described to shunt the manual starter switch as in Figs. 1 and 3, terminal 60' and 66 are connected to the circuit by leads 69 and 70, respectively, while terminal 59' and 67 are connected to the battery and ground respectively. Although different connections are employed, the operation is the same.

When the engine begins to run, current from the generator flows from terminal 66 through winding 82 to ground by way of terminal 67, thus pulling armature 83 to condition the switch for operation by closing the contacts. Now, if engine 1 stalls, current will flow from the battery to terminal 59' and through switch arm 88, contacts 89, 86, coil 84, resistance 85, to ground by way of terminal 66 and the generator brushes. This current will, after a predetermined interval, heat switch arm 88, which will snap open, de-energizing the holding coil 84 and the shunt circuit which is completed from terminal 60', contacts 92, 90 and 89, 86, winding 84, and resistance 85, to terminal 66, thereby disabling the shunt circuit which includes lines 69 and 70 and switch ES.

Figure 8:
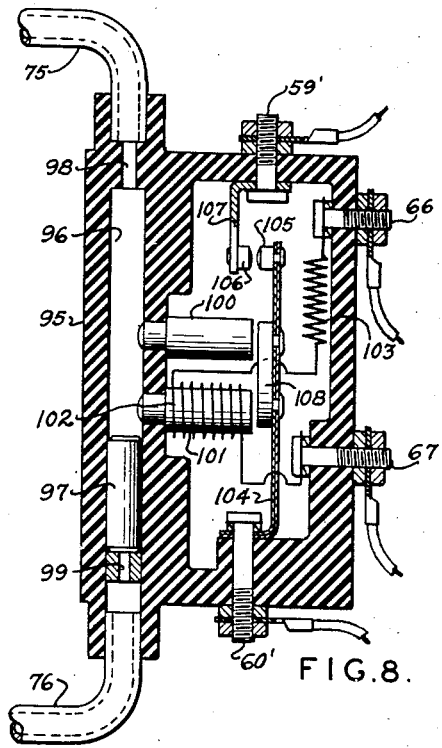
Fig. 8 is a cross-sectional view of a differential pressure operated electric thermal switch suitable for use in the above system.
Figure 10:
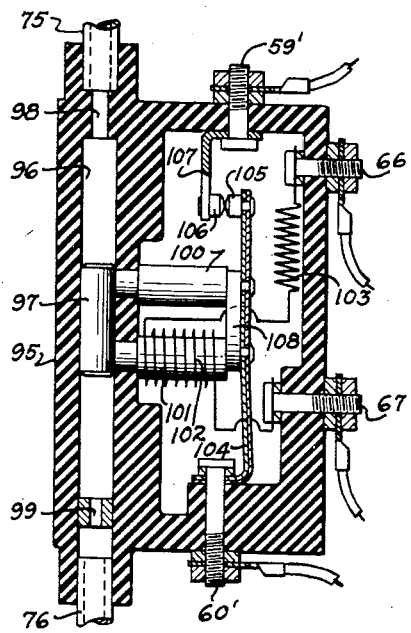
Fig. 10 is a cross-sectional view of the same switch in a closed position.
Figure 9:
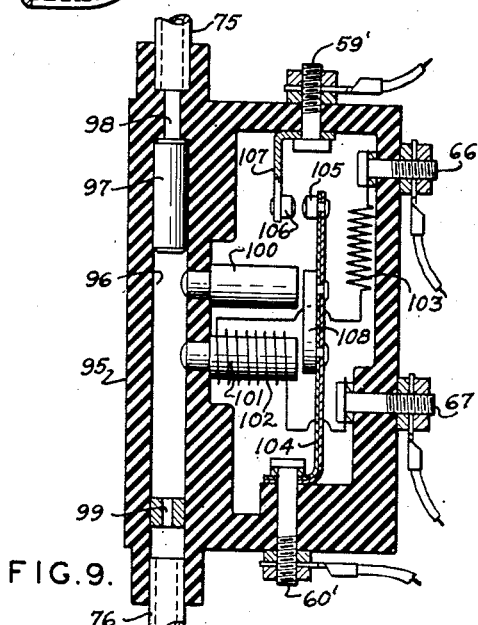
Fig. 9 is a cross-sectional view of the same switch when conditioned for operation by either suction or pressure.

Figs. 8, 9 and 10 illustrate a second type of switch readily adaptable to the systems above described. The same reference characters have been used to indicate corresponding switch connections.

The casing 95 of insulating material is provided with a cylinder 96 in which is a slidable plug piston 97 of iron, or the like, which is subject to attraction by magnetic forces. The casing is mounted upright, so that gravity will act to position the piston 97, as in Fig. 8. Restrictions 98 and 99 confine the piston within cylinder 96. Pipes 75 and 76 connect the cylinder to a source of differential pressures so that, during engine operation, piston 97 will be displaced to the position shown in Fig. 9 against the force of gravity acting on the piston due to the position of the casing, thus conditioning the switch for operation.

Two cores 100 and 101 are mounted in the cylinder wall but recessed out of the path of movement of the piston 97. Core 101 has a winding 102 connected by way of resistance 103 with terminal 66 and directly to terminal 67. Secured in position by terminal 60' is a bimetallic switch arm 104 carrying contact 105 at its free end for cooperation with contact 106 on spring arm 107 secured to terminal 59'. Armature 108 is secured on switch arm 104 by rivets in a position opposite the ends of cores 100 and 101.

Resistance 103 is in the form of an electric heater for switch arm 104 and may be constructed to be positioned as shown, or incorporated with the switch arm 104, as in Fig. 7.

In operation, when connected in the systems above described, as illustrated by Figs. 2 and 6, the switch is conditioned for operation after the engine is started by the operation of the manual controls and pressure acts through pipe 76 or suction through pipe 75 by displacing piston 97 to the position shown in Fig. 9. No current will be flowing, or at least very little; consequently, the cores will not be energized. This is because winding 102 is connected to the battery by terminal 66 and to the generator by terminal 67, so that there is no ground from 67 when the engine is running and the generator has potential. However, if the engine should stall, current will immediately begin to flow through winding 102 from the battery to ground through the generator to energize core 101. This will begin heating resistance 103. There will be a slight delay after the engine stalls to provide time for the dissipation of suction in pipe 75 or pressure in pipe 76, as the case may be. This may be regulated by the provision of bleed passages through the piston 97, if desired.

When the piston drops, the force of gravity is insufficient to cause the piston to pass the strong magnetic field set up by the energized winding 102 on core 101 because the proximity of armature 108 forms a horseshoe magnet with core 100. Consequently, piston 97 will be trapped by this magnetic field in the position of Figure 10. In this position the magnetic field will be many times greater than in Fig. 9, which field will be strong enough then to overcome the initial resistance in bimetallic spring arm 104 and the armature will be snapped into contact with the pole pieces or cores 100 and 101, closing switch contacts 105 and 106 to complete the circuit between terminals 59' and 60'.

The switch will then be closed and remain closed for a predetermined interval until switch arm 104 is heated a predetermined degree by resistance 103. When this occurs, switch arm 104 snaps open, withdrawing armature 108 from the cores and opening switch contacts 105 and 106. Armature 108 will be displaced in, or from, the magnetic field sufficient to break the magnetic circuit between cores 100 and 101, which will leave only the magnetic attraction of core 101 acting on piston 97. This is insufficient to balance the attraction of gravity and piston 97 drops to the position of Fig. 8.

From the above it will be readily understood that the switch is conditioned for operation by pressure, magnetically actuated by gravity or failure of pressure, and opened by thermal action.

Since this switch is connected in the same manner in each case for Figs. 2, 4 and 6, a further description along these lines does not appear necessary.

Figure 11:
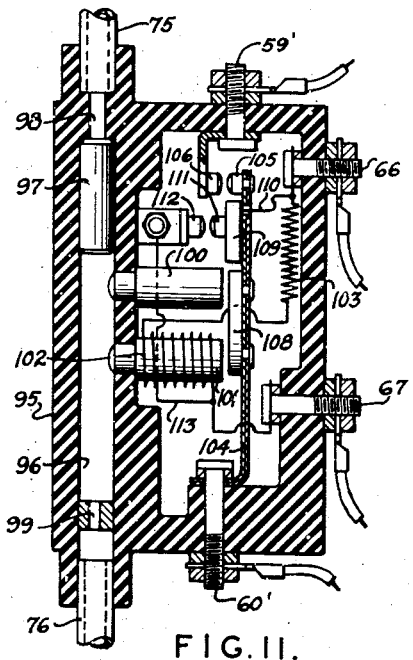
Fig. 11 is a cross-sectional view of a differential pressure type of electric thermal switch.

Fig. 11 illustrates a modification of the switch shown in Figs. 8, 9 and 10, in which a separate heater element for the bimetallic switch blade is mounted directly upon the blade itself, thus providing heating by conduction, as well as radiation. The same reference characters have been used to indicate the same or identical parts.

In this modification, a casing 95 of insulating material is provided with a cylinder 96 in which is slidably mounted a plug piston 97 of iron, or the like, which is subject to attraction by magnetic forces. Casing 95 is adapted to be mounted upright so that gravity will act to position the piston 97 in the cylinder 96 as shown in the preceding views, especially Fig. 8. Restrictions 98 and 99 confine the piston within the cylinder 96. Pipes 75 and 76 are connected to a source of differential pressures so that during engine operation piston 97 will be displaced to the position shown, against the force of gravity acting on the piston due to the position of the casing. Two cores 100 and 101 are mounted in the cylinder wall, but, as shown, are recessed out of the path of movement of the piston 97. Core 101 has a winding 102 connected by way of a resistance 103 with terminal 66, and also directly to terminal 67. Secured in position by terminal 60' is a bimetallic switch arm 104 carrying a contact 105 at its free end for cooperation with a contact 106 on spring arm 107 secured to terminal 59'. Armature 108 is secured to switch arm 104 by rivets in a position opposite the ends of cores 100 and 101.

Resistance 103 is disposed adjacent the bimetallic switch arm, but the primary heating of the switch arm in this modification is accomplished by a heater element 109 mounted directly on the switch blade. A flexible conductor 110 connects between the heater and terminal 66, which leads to the battery, and the circuit through the heater is completed by a pair of contacts 111 and 112, the latter of which is connected to ground by a lead 113.

In operation, when connected in the systems above described and illustrated by Figs. 2 and 6, this switch is conditioned for operation after the engine starts and pressure acts through pipe 76, or suction through pipe 75, by displacing piston 97 to a position such as shown. No current will be flowing from terminal 66 through the coil on the core 101 to the terminal 67. Consequently, these cores will not be energized. This is because winding 102 is connected to the battery by terminal 66 and to the generator by terminal 67. There is, consequently, no ground through terminal 67 when the engine is running and the generator has potential. However, if the engine should stall, current will immediately begin to flow through winding 102 from the battery to ground through the generator, thus energizing core 101. After a slight delay to provide time for the dissipation of suction in the pipe 75 or pressure in pipe 76, as the case may be, the piston 97 will drop. When this happens, a strong magnetic field has been set up due to the energized winding 102 on core 101 and due to the fact that the proximity of the armature 108 forms a horseshoe magnet with the core 100 and 101. The force of gravity is insufficient to cause the piston to pass through this magnetic field, and it will accordingly be trapped in a position such as shown in Fig. 10. This position of the piston causes the strength of the magnetic field to become many times greater, so that it is strong enough to overcome the resistance of the bimetallic spring arm 104, whereby armature 108 will be snapped into contact with the pole pieces of cores 100 and 101, closing contacts 105 and 106 to complete the circuit between terminals 59' and 60', and also closing contacts 111 and 112 to complete the circuit through the heater element 109 from terminal 66 to terminal 67.

The switch will then remain closed for a predetermined interval until switch arm 104 is heated by heater element 109 a predetermined degree. When this happens, switch arm 104 snaps open, withdrawing armature 108 from the cores 100 and 101 and opening the switch contacts 105, 106 and 111, 112. Armature 108 will be displaced in, or from, the magnetic field sufficient to break the magnetic field between cores 100 and 101, which will leave only the magnetic attraction of core 101 acting on piston 97. This is insufficient to balance the attraction by gravity, and piston 97 drops to the position shown in Fig. 8.

Figure 12:
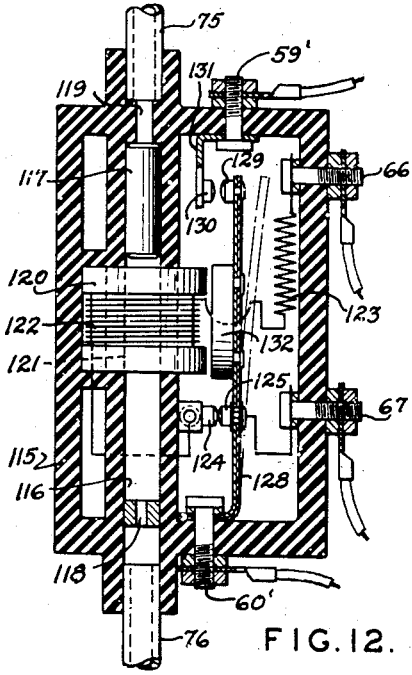
Fig. 12 is a view, partly in section, of a differential pressure type of electric thermal switch.

Fig. 12 illustrates another type of switch readily adaptable to the systems above described. In this figure, a casing 115 of insulating material is provided with a cylinder 116 in which is slidably mounted a plug piston 117 of iron, or the like, which is subject to attraction by magnetic forces. As in the previous modification, the casing is mounted upright so that gravity will act to position the piston 117 as in Fig. 8. Restrictions 118 and 119 confine the piston within the cylinder 116. Pipes 75 and 76 connect the cylinder to a source of differential pressures such as previously described. Within the casing 115, and coincidental with the cylinder 116 is a solenoid 120 provided with a cylindrical bore 121 through which the piston 117 may pass. Solenoid 120 is provided with a winding 122 connected by way of a resistance 123 with terminal 66 and with switch contact point 124 fixedly positioned within the casing 115. Resistance 123 is in the form of an electric heater, and may be constructed to be positioned as shown, or incorporated with the arm of the switch as in Figs. 7 or 11. Rigidly mounted on the terminal 60' is a bimetallic thermal responsive switch arm 128, which carries at its free end a contact 129 adapted to cooperate with a contact 130 mounted on an arm 131 secured to terminal 59'. Armature 132 is mounted on the switch arm 128 and extends from pole to pole of the solenoid 120. Switch arm 128 also carries a contact 125 opposite contact 124 which is insulated from the arm and connected to ground through terminal 67.

In operation, when connected in the systems shown in Figs. 2, 4 and 6, this switch is conditioned for operation after the engine starts and piston 117 is displaced from the bottom of cylinder 116 to the top thereof. No current will be flowing, or at least very little, through the winding 122 on the solenoid 120. Consequently, the solenoid will not be energized. This is because winding 122 is connected to the battery by terminal 66 and to the generator by terminal 67 through contacts 124 and 125, and there is consequently no ground from terminal 67 when the engine is running and the generator has potential, even though contacts 124 and 125 are closed in the intermediate position of the switch arm 128 illustrated. However, if the engine should stall, current will immediately begin to flow through the winding 121 and contacts 124 and 125 to terminal 67, and thus to ground through the generator. This will immediately energize solenoid 120 and at the same time begin the heating of the resistance 123. After a slight delay, piston 117 will drop, but it will immediately be trapped by the magnetic field produced by solenoid 120, thus completing the magnetic field through the solenoid and increasing its magnetic attraction on armature 132 by closing the magnetic circuit between opposite poles of the solenoid. In this position of the piston, the magnetic field will be many times greater than when the piston is positioned as shown, and the field will then be strong enough to overcome the initial resistance in bimetallic spring arm 128. This will cause armature 132 to snap into contact with the pole pieces at the opposite ends of the solenoid and deform the switch arm, bringing contacts 129 and 130 together.

The switch will then be closed and remain closed for a predetermined interval until the switch arm 128 is heated a predetermined degree by resistance 123. When this occurs, switch arm 128 snaps open, withdrawing armature 132 from the pole pieces at the end of the solenoid and opening contacts 129, 130 and 124, 125, opening the switch, and at the same time deenergizing the solenoid 120, allowing piston 117 to drop to the bottom of the cylinder 116.

As in the previous switches, the falling of the piston to the bottom of the cylinder prevents the switch from again closing until it is first conditioned by engine operation displacing the piston to the top of the cylinder.

Figure 13:
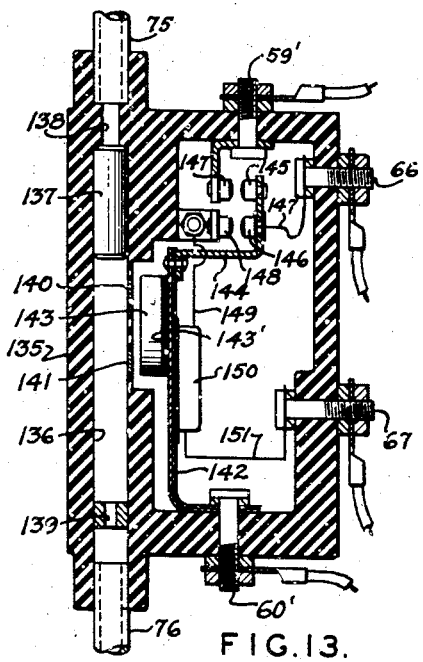
Fig. 13 is a view, partly in section, of another differential pressure type of electric thermal switch using a permanent magnet.

Fig. 13 illustrates another type of switch readily adaptable to the systems above described. The same reference characters have been used to indicate corresponding switch connections.

A casing 135 of insulating material is provided with a cylinder 136 in which is mounted the usual slidable piston 137. Restrictions 138 and 139 confine the piston within the cylinder. Pipes 75 and 76 connect the cylinder with a source of differential pressures as described for the other embodiments. In this modification the cylinder is provided with a pair of magnetic windows 140 and 141, which are spaced metallic inserts in the wall of the cylinder 136. These windows are for the purpose of transmitting magnetic forces through the cylinder wall. Within the switch body is a bimetallic thermal responsive switch blade 142 secured in place by terminal 60'. Intermediate its length is secured a permanent magnet 143 of "Alnico," or the like. The free end of the switch arm 142 carries a switch bracket 144 on which are mounted a pair of contacts 145 and 146, the latter of which is insulated from the bracket and has a connection 147 with terminal 66. Mounted on a bracket opposite switch contact 145 is a contact 147 secured in place by the terminal 59'. A contact 148 is mounted opposite contact 146 on a fixed bracket within the switch body and connected by way of lead 149 with heater element 150 mounted on the switch blade. The heater 150 is grounded by way of a lead 151 connecting with switch terminal 67. Magnet 143 is provided with heat insulation 143'.

In operation, when connected in the systems above described and illustrated, this switch is conditioned for operation in the same manner as those previously described, by the displacement of the piston 137 to the top of the cylinder in response to operation of the engine, which produces a difference in pressures on opposite sides of the piston sufficient to snap the piston to the top, past the magnet. In this position of the piston, no current will be flowing through the switch, because the contacts are open. If the engine should stall, however, piston 137 will subsequently drop, and when it reaches a position adjacent the magnetic windows 140 and 141, it will intercept the lines of magnetic force from the permanent magnet 143 through the windows. The piston is so constructed as to be of insufficient weight to overcome that force, and will be trapped in the cylinder by the magnetic lines of force from the permanent magnet 143. When this happens, the piston is of sufficient thickness and mass that the magnet 143 will be attracted to it, thereby overcoming the resistance of the spring arm 142. Permanent magnet 143 will then be pulled tight against the magnetic windows 140 and 141 because of the attraction on the magnet by the proximity of the piston 137. This movement of the spring arm closes contacts 145, 147 and 146, 148, completing the circuit through the switch between 59' and 60' and the circuit through the heater 150 to ground. The switch will then be closed and remain closed for a predetermined interval until the switch arm 142 is heated a predetermined degree by heater 150. When this occurs, switch arm 142 will overcome the magnetic attraction and snap open, thus opening the switch contacts, and so weakening the magnetic field with the piston 137 as to allow the piston to drop to the bottom of the cylinder. This will occur because the displacement of the switch arm 142, due to the heating effect, will greatly increase the distance between the magnet 143 and the magnetic windows 140 and 141 beyond the position illustrated. As the switch arm 142 cools, it will return to a neutral position such as shown in Fig. 13, but will not be attracted to the magnetic windows 140 and 141 because of their little mass and thinness, which produce a negligible amount of magnetic attraction between the magnet and the windows, since the lines of force cut by the windows are very few.

Figure 14:
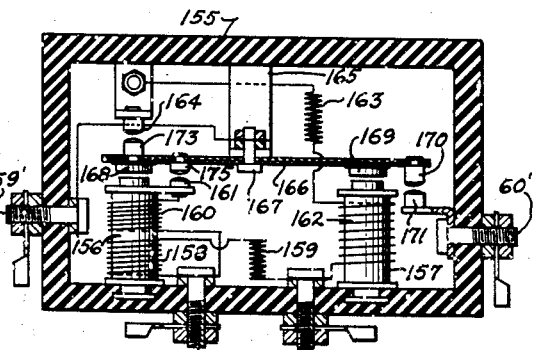
Fig. 14 is a view, partly in section, of a thermal electric switch of a three-cycle type.

Fig. 14 is exemplary of another type of switch suitable for use in the systems above described. In this figure, 155 illustrates a switch casing of insulating material in which is mounted a pair of electromagnetic cores 156 and 157 supported from portions thereof imbedded in the casing structure. The casing is illustrated in section, and may be completely airtight and provided with four electric terminals 59', 60', 66 and 67. Core 156 is provided with a first winding 158 connected to the terminal 66 through a resistance 159 and directly with ground terminal 67. A second winding 160 connects at one end with switch contact 161 and at the other with the ground by way of switch terminal 67. Core 157 is provided with a winding 162 connected with the ground by way of terminal 66 and through a resistance 163 with switch contact 164 fixedly mounted on a bracket supported by the casing 155. Also supported by the casing is a bracket 165 forming a support for bimetallic thermal switch blade 166 mounted intermediate its ends on the bracket 165 by a terminal 167, which is, in turn, connected directly with terminal 59'. Switch blade 166 mounts an armature 168 opposite the core of electromagnet 156, and armature 169 opposite the core of the electromagnet 157. Adjacent the armature 169 is a contact 170 mounted at the end of the blade, which cooperates with a contact 171 on a bracket fixed to the casing by terminal 60'. Opposite armature 168 is a switch contact 173 which coacts with contact 164 mounted on a bracket fixed to the casing 155. Switch blade 166 also carries a contact 175 opposite contact 161, which is mounted on the magnet core 156.

In operation, when this switch is connected into the systems such as shown by Figs. 1 and 5, terminals 59' and 60' are connected to the shunting circuit 59, 60, and terminals 66 and 67 are connected to the generator and ground, respectively.

After the engine is started by operation of switch 7, current will flow from the generator to terminal 66 and thence through resistance 159, winding 158 to terminal 67 and ground. The presence of the resistance 159 in this circuit prevents a large amount of current flow through the winding, but there will be sufficient to energize the magnet 156, overcoming the resistance in the spring arm 166 to snap armature 168 into contact with the core, thereby closing contacts 161 and 175 and conditioning the switch for operation. Now, if the engine should stall, current will flow from terminal 59' to the center of the switch blade 166, and thence through the switch blade and contacts 175, 161 to coil 160 and terminal 67 to ground, thus holding the armature 168 in contact with the core of the magnet 156, and consequently the circuit through the switch blade to contacts 175, 161, etc., closed. The flow of current through the switch blade 166 will begin to heat the lefthand portion thereof. The switch blade is calibrated so that a predetermined time after the engine stalls (which time interval is sufficient to allow the engine to come to rest) this portion of the blade 166 will reach a temperature causing the armature 168 to leave the core 156 by a snap action, thus breaking the contact between 161 and 175 and establishing a new contact from 173 to 164 to energize winding 162 on magnet core 157. When core 157 becomes energized, it overcomes the resistance of the resilient switch blade 166, pulling armature 169 into contact with the core and closing contacts 170, 171, thereby establishing a shunting circuit between terminal 59' through the switch blade to terminal 60'. Because of the resistance 63, the heating effect of the current passing through the lefthand part of the switch blade will be less when 164 and 173 are in contact than when 175 and 161 are in contact and, after a predetermined time, the lefthand portion of the switch blade will cool sufficiently to break contact 164 and 173 to de-energize magnet 157, restoring switch arm 166 to the neutral position illustrated in Fig. 14, and thereby breaking the shunting circuit between 59' and 60' by opening contacts 170, 171, or the righthand portion of the switch will become hot enough to snap open. Such a switch has three cycles of operation which are controlled in time by proper calibration of the thermal switch blade.

In operation, when connected into the systems above described to shunt the manual starter switch as in Figs. 1 and 3, terminals 60' and 66 are connected to the circuit shunting starter switch 7 by leads 69 and 70, respectively, and power to operate this switch is provided to terminal 59' by lead 72, and a connection is provided from terminal 67 to ground. Although different connections are employed, the operation of the switch is the same. When the engine begins to operate, current from the generator is supplied to terminal 66, thus conditioning the switch for operation by closing contacts 175 and 161. When the engine stalls, current will flow from the battery through terminal 59', and thence through the contacts 175, 161, coil 160, to ground. This condition will exist for a predetermined period to allow the engine to come to a complete rest, after which the heating of bimetallic switch arm 166 will cause it to overcome the pull of the core 156 and snap open, bringing contact 173 into engagement with contact 164, thus completing the circuit through coil 162 from the battery to ground by way of terminal 66, and closing contacts 170, 171 to establish the shunting circuit, which will now lead from terminal 60', contacts 171, 170, switch arm 166, contacts 173, 164, coil 162, to terminal 66. After a predetermined period, the lefthand portion of the bimetallic switch blade 166 will cool, opening contacts 173 and 164, de-energizing coil 162, and opening contacts 170, 171 to break the shunt circuit, or the righthand portion of switch blade 166 will become hot enough to snap open. Either action disables the shunt circuit.

The description so far has been devoted to an explanation in detail of the restarting systems and to switches of types suitable for use in those systems. The switches have been described generally and in detail, together with their electrical connections into the systems. The types of switches described have been referred to by the letters ES and PS, and, as will be obvious from the preceding description, some are conditioned for operation electrically and some by a pressure difference, but all include a timer which is thermal responsive to predetermine the duration of its operation.

In Figs. 15 to 18, inclusive, a few examples are shown illustrating some of the ways in which the pressure-conditioned type of switch may be connected with the engine 1 and its accessories.

Figure 15:
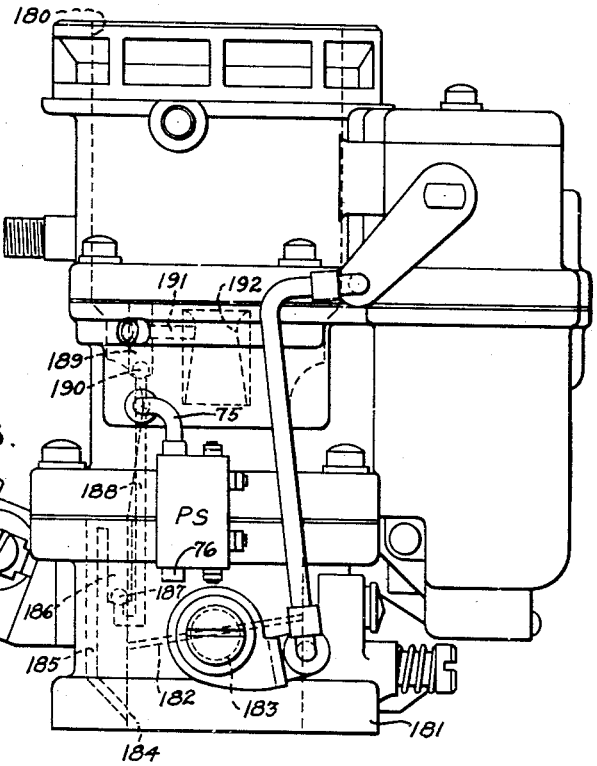
Fig. 15 is a view showing a differential pressure type of switch on a carburetor.

In Fig. 15 a carburetor of conventional, plain tube, downdraft type is illustrated, having a mixture conduit 180 and a flange 181 for mounting the carburetor on the intake manifold of an engine. Within the tube 180 is a throttle valve 182, shown in dotted lines, provided with an actuating throttle shaft 183, which is adapted to operate a starter switch 7 in a manner well known in the art disclosed by the Coffey Patent Re. 22,385. Within the carburetor is a passage, indicated in dotted lines, leading from a port 184 through the body of the carburetor. The passage has a portion indicated as 185, which connects with a chamber 186 containing a ball check valve 187. From the seat of the ball check valve a second passage 188 leads to a second chamber 189, which contains a second ball check valve 190. Chamber 189 is, in turn, connected by a passage 191 with the throat of primary Venturi tube 192. Switch PS of any one of the types above described is connected to passage 188 intermediate the two ball check valves 187 and 190 by a pipe 75; the other pipe 76, leading to the switch, is provided with a screen, or the like, and is open to atmosphere.

This particular manner of connecting the switch will provide the switch with a source of suction for operation of the same in response to a condition indicative of operation of the engine. Such a condition will be indicated by suction either posterior of the throttle at the port 184 or suction at the throat of the primary venturi 192. Since pipe 75 is connected between the two check valves 187 and 190, it will be subject to suction regardless of the conditions of operation of the engine, since whichever suction source is the greater will act through pipe 75 to operate the switch. For example, if suction is greater at the port 184 than at the Venturi throat 192, check valve 190 will be closed, and the switch will be subject to the suction posterior of the throttle. On the other hand, if the throttle should be tipped wide open at low speeds so as to relieve the suction at port 184, then check valve 187 will close because the suction at the throat of the venturi will immediately increase, opening check valve 190. Such a system will therefore be definitely indicative of engine operation.

Figure 16:
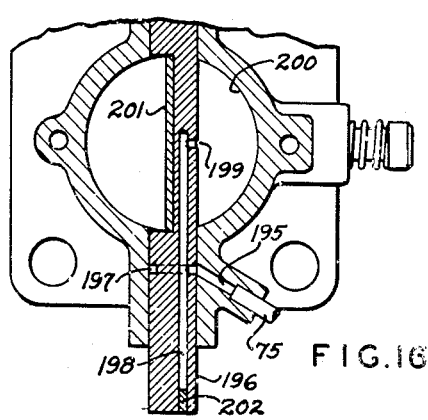
Fig. 16 is a cross-sectional view of a throttle body.
Figure 17:
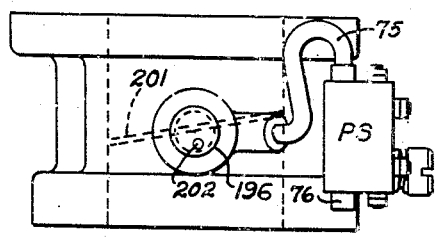
Fig. 17 is a view, in elevation, of the device shown in Fig. 16.

Figs. 16 and 17 illustrate another manner of connecting the switch PS. These figures show in section and elevation a throttle body with a switch PS connected by the pipe 75 with a bore 195 in a boss adjacent one of the bearings for the throttle shaft 196. Where the bore 195 intersects the bearing surface of the throttle shaft 196, the shaft has a circumferential groove 197, which, in turn, communicates with a bore 198 extending axially of the shaft to a port 199 in the half-round portion of the throttle shaft within the mixture conduit 200, which mounts the throttle valve 201. A plug 202 closes the bore 198 in the exposed end of the throttle shaft 196.

In this system a continuous passage is provided from the switch PS to the port 199 at the center of the mixture conduit for all throttle positions, and it will be noted that this port 199, when the throttle is in the closed positions as shown in Fig. 17, is exposed to suction pressures posterior to the throttle 201. On the other hand, when the throttle is in the range of positions approaching and including a wide-open position, the port 199 will then be exposed to the high velocity flow of air over the half-round portion of the throttle shaft. Because of the shape of the shaft, port 199 will be located in a region of highest velocity in the mixture conduit. It will therefore be exposed to the lowest possible pressure. This is due to the fact that the camber surface of the shaft acts similar to the upper surface of an airplane wing. Port 199 will therefore be positioned to respond to conditions indicative of engine operation.

Figure 18:
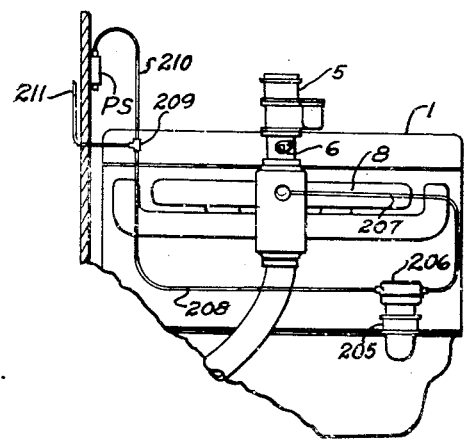
Fig. 18 is a diagrammatic view of a differential pressure switch connected to the suction line for operating the windshield wiper motor.

Turning now to Fig. 18, the engine 1 therein shown is provided with an intake manifold 8 upon which is mounted a carburetor 5 having a throttle shaft 6, as described in Fig. 1, etc. Mounted in a position corresponding to that of the camshaft of the engine is a fuel pump 205 provided with a vacuum booster pump section 206 of conventional construction such as generally used for boosting suction of the carburetor to operate vacuum windshield wipers and the like. A pipe 207 leads from the vacuum booster 206 to intake manifold 8. A second pipe 208 leads from the booster to a T fitting 209. From the fitting, one branch 210 connects with the switch PS, while a second branch 211 is provided for connection to the wiper motor.

In Fig. 18, a source of differential pressures will be provided for the switch PS which are indicative of engine operation, since, so long as the engine 1 operates, there will be a source of suction either posterior of the throttle in the intake manifold or, if that fails, a source of suction in the booster pump 206. It will be understood that this showing is diagrammatic only, and does not illustrate the usual check valves provided in such a system.

The systems, the switches, and their connections, described and illustrated, should be regarded as exemplary only, and not in a limiting sense, since many obvious variations and uses will readily occur to those skilled in the art, which are clearly within the scope of the invention as defined by the appended claims.

I claim:

1. A restarting system for a power source of a motor vehicle having a battery, a starter motor for said power source and a circuit from said battery to said motor including switch means for energizing said circuit, a device operative for opening and closing said circuit associated with said switch means and having a connection with said circuit and said power source, a means in said device energized by said power source through said connection to condition said device for operation, and a timer for said device powered from said circuit and operated by de-energization of said means to predetermine the duration of operation of said device.

2. A restarting system for a power source of a motor vehicle having a battery, a starter motor for said power source and a control circuit from said battery to said motor, a device for opening and closing said circuit having a connection with said circuit and said power source, a means in said device energized by said power source through said connection to condition said device for operation, and a timer for said device powered from said circuit and operated by de-energization of said means by said source to predetermine the duration of closing operation of said device.

3. A restarting system for a power source of a motor vehicle having a battery, a starter motor for said power source and a control circuit from said battery to said motor, a device for opening and closing said circuit having a connection with said circuit and said power source, a means in said device energized by said power source through said connection to condition said device for operation, and a timer for said device powered from said circuit and said source and operated by deenergization of said means by said source to predetermine the duration of closing operation of said device.

4. A restarting system for a power source of a motor vehicle having a battery, a starter motor for said power source, and a circuit from said battery to said motor including a plurality of switch means for energizing said circuit, devices operative for opening and closing said circuit associated with said switch means and having connections with said circuit and said power source, a means in said devices energized by said power source through said connections to condition said devices for operation, and a timer for said devices powered from said circuit and operated by de-energization of said means by said source to predetermine the duration of operation of said devices.

5. A restarting system for a power source of a motor vehicle having a battery, a starter motor for said power source, and a circuit from said battery to said motor including a plurality of switch means for energizing said circuit, devices operative for opening and closing said circuit associated with said switch means and having connections with said circuit and said power source, a means in said devices energized by said power source through said connections to condition said devices for operation, and a timer for said devices powered from said circuit and said source, and operated by de-energization of said means by said source to predetermine the duration of operation of said devices.

6. A restarting system for a power source of a motor vehicle having a battery, a starter motor for said power source, and a circuit from said battery to said motor including a plurality of switch means for energizing said circuit, devices operative for opening and closing said circuit associated with said switch means and having connections with said circuit and said power source, said devices including a magnetic operator, a means energized by said power source through said connections to condition said magnetic operator for operation, and responsive to a condition indicative of power failure from said source to increase the power of said magnetic operator to actuate said devices, and a timer operated in response to actuation of said operator and by de-energization of said means to predetermine the duration of actuation of said devices.

7. A starting system for a power source of a motor vehicle having a battery, a starter motor for said power source, and a control circuit from said battery to said motor including a plurality of switch means, a plurality of switch devices operatively connected to said power source and to said circuit in shunt relation with some but not all of said switch means, said devices including a magnet, a thermal responsive switch adjacent said magnet, a heating circuit for said switch controlled thereby, and an operator for said magnet, responsive to a condition indicative of power failure from said source to energize said magnet to displace said switch and close said switch devices and thereby shunt said switch means and close said heating circuits, said switch being calibrated to open at a certain temperature to predetermine the duration of the closed cycle of said switch devices.

8. A restarting system for a power source of a motor vehicle having a battery, a starter motor for said power source, and a control circuit from said battery to said motor including a plurality of switch means, a plurality of switch devices operatively connected to said power source and said battery circuit in shunt relation to some but not all of said switch means, said devices including a magnet, a thermal responsive switch adjacent said magnet, a heating circuit for said arm closed by operation of said switch by said magnet, and an operating means for said magnet responsive to a condition indicative of operation of said power source through said connection to effect attraction by said magnet and close said switch and thereby said circuits, and said operating means being responsive to a condition indicative of power failure of said source to energize the closed circuits.

9. In a motor vehicle having a power source, controls for the power output from said source, a starter control circuit for said source, and a means in said circuit operated by said controls when in selected positions for opening or closing said circuit, the combination therewith of a device operatively connected with said circuit and said source having a part conditioned for operation by said source through said connection, and responsive to a condition indicative of power failure from said source to actuate said device by operation of said part to close said starter control circuit, said device including a thermal element to predetermine the duration of its response.

10. In a motor vehicle having a power source, controls for the power output from said source, a starter control circuit for said source and a means in said circuit operated by said controls when in selected positions for opening and closing said circuit, the combination therewith of a device operatively connected with said circuit and said power source and having a part to be conditioned for operation by said source through said circuit connection and responsive to a condition indicative of power failure from said source to actuate said device by operation of said part to close said starter control circuit, said device including a thermal element to predetermine the duration of its response.

11. In a motor vehicle having a power source, controls for the power output from said source, a starter control circuit for said source and a means in said circuit operated by said controls when in selected positions for opening and closing said circuit, the combination therewith of a device operatively connected with said circuit and said power source, and having a part to be conditioned for operation by said source through said circuit connection and responsive to a condition indicative of power failure from said source to actuate said device by operation of said part to close said starter control circuit, said device including a timer powered from said circuit to predetermine the duration of its response.

12. In a motor vehicle having a power source including an engine and transmission, a control for the power output of said engine, a control selector for transmission response, a starter control circuit and a means in said circuit operated by said controls when in selected position for opening and closing said circuit, the combination therewith of a device operatively connected with said circuit and said source, said device having a movable part conditioned for subsequent operation by said source and responsive to a condition indicative of power failure from said source to actuate said device by said part to close said starter control circuit, said device including a thermal element to predetermine the duration of its response.

13. In a motor vehicle having a power source including an engine and transmission, a control for the power output of said engine, a control selector for transmission response, a starter control circuit and a means in said circuit operated by said controls when in selected position for opening and closing said circuit, the combination therewith of a device operatively connected to said power source and in shunt relation with said means, said device having a movable part conditioned for subsequent operation by said source and responsive to a condition indicative of power failure from said source to actuate said device by said part to close said starter control circuit, said device including a thermal element to predetermine the duration of its response.

14. In a motor vehicle having a power source including an engine and transmission, a control for the power output of said engine, a control selector lever for determining transmission response, a starter control circuit, a first switch in said circuit operated by said engine control, and a second switch in said circuit in series relation with said first switch operated by said control selector lever to close when in selected neutral positions of said control selector lever, the combination therewith of switch devices operatively connected to said power source and in shunt relation with said first and second switches, said switch devices having a magnet, a switch arm, and a movable part conditioned for subsequent operation by said source and moved responsive to a condition indicative of power failure from said source to energize said magnet by said movement to operate said switch arm and thereby complete said starter circuit.

15. In a motor vehicle having a power source including an engine and transmission, a control for the power output of said engine, a control selector lever for determining transmission response, a starter control circuit, a first switch in said circuit operated by said engine control, and a second switch in said circuit in series relation with said first switch operated by said control selector lever to close when in selected neutral positions of said control selector lever, the combination therewith of a switch device operatively connected to said power source and in shunt relation with said second switch, said switch device having a magnet, a switch arm, and a movable part conditioned for subsequent operation by said source through said connection, and moved responsive to a condition indicative of power failure from said source to actuate said magnet by said movement to operate said switch arm and thereby shunt said second switch.

16. In a motor vehicle having a power source including an engine and transmission, a control for the power output of said engine, a control selector lever for determining transmission response, a starter control circuit, a first switch in said circuit operated by said engine control, and a second switch in said circuit in series relation with said first switch operated by said control selector lever to close when in selected neutral positions of said control selector lever, the combination therewith of a switch device operatively connected to said power source and in shunt relation with said first switch, said switch device having a magnet, a switch arm, and a movable part conditioned for subsequent operation by said source through said connection and moved responsive to a condition indicative of power failure from said source to actuate said magnet by said movement to operate said switch arm and thereby shunt said first switch.

17. In an electrical system for a power source of a motor vehicle having a motor, a battery, and a control circuit from said battery to said motor, a switch device for said circuit comprising a solenoid, a fixedly mounted bimetallic spring switch arm, switch contacts on said arm and said device adapted to close by movement of said arm by said solenoid, a first circuit for said device connecting said power source and said solenoid to energize said solenoid, whereby said contacts are closed, a second circuit for said device connecting said control circuit and solenoid through said contacts and switch arm to thereby close said control circuit through said switch arm to maintain said solenoid energized and to produce an increase in temperature in said arm whereby said contacts are opened.

18. In an electrical system for a power source of a motor vehicle having a motor, a battery, and a control circuit from said battery to said motor, a switch device for said circuit comprising a magnet, a fixedly mounted bimetallic spring switch arm, switch contacts on said arm and said device adapted to close by movement of said arm by said magnet, a first circuit for said device connecting said power source and said magnet, having a means to energize said magnet whereby said contacts are closed, a second circuit for said device connected to said control circuit through said contacts and switch arm to close said control circuit from said battery to said motor to produce an increase in temperature in said arm whereby said contacts are opened.

19. In an electrical system for an engine producing a source of differential pressure, a starter motor, a battery, and a control circuit from said battery to said motor, a switch device for said circuit comprising a magnet, a movable core for said magnet, a fixedly mounted bimetallic spring switch arm, switch contacts on said arm and said device adapted to close by movement of said arm by said magnet, a first circuit for said device connecting said source of differential pressures to move said core into the field of said magnet to increase the attraction of said magnet to overcome the tension in said spring switch arm whereby said contacts are closed, a second circuit for said device connected to said control circuit through said contacts and switch arm to close said control circuit between said motor and said battery to produce an increase in temperature in said spring switch arm whereby said contacts are opened.

20. The combination as defined in claim 19 wherein said source of differential pressures comprises a carburetor connection between a port posterior the throttle and a port in the primary venturi.

21. The combination as defined in claim 19 wherein said source of differential pressures comprises a carburetor connection to a port in the throttle shaft posterior to the throttle when closed.

22. The combination as defined in claim 19 wherein said source comprises a pump driven by said engine.

References Cited in the file of this patent

UNITED STATES PATENTS

| Number | Name | Date |
|---|---|---|
| Re. 22,385 | Coffey | Oct. 26, 1943 |
| 1,293,569 | Stein | Feb. 4, 1919 |
| 1,538,213 | Randall | May 19, 1925 |
| 1,771,866 | Stevenson et al. | July 29, 1930 |
| 1,788,713 | Good et al. | Jan. 31, 1931 |
| 1,930,200 | Harrison | Oct. 10, 1933 |
| 1,936,619 | Christian | Nov. 28, 1933 |
| 1,974,208 | Ferguson | Sept. 18, 1934 |
| 1,981,879 | Sayre | Nov. 27, 1934 |
| 1,981,880 | Sayre | Nov. 27, 1934 |
| 2,013,189 | Sayre | Sept. 3, 1935 |
| 2,064,358 | Sayre | Dec. 15, 1936 |
| 2,399,542 | Collins | Apr. 30, 1946 |

OTHER REFERENCES

The Blue Book of Thermometals and Electrical Contacts, by the H. A. Wilson Company, 105 Chestnut Street, Newark, New Jersey, page 6.